Patented Jan. 12, 1926.

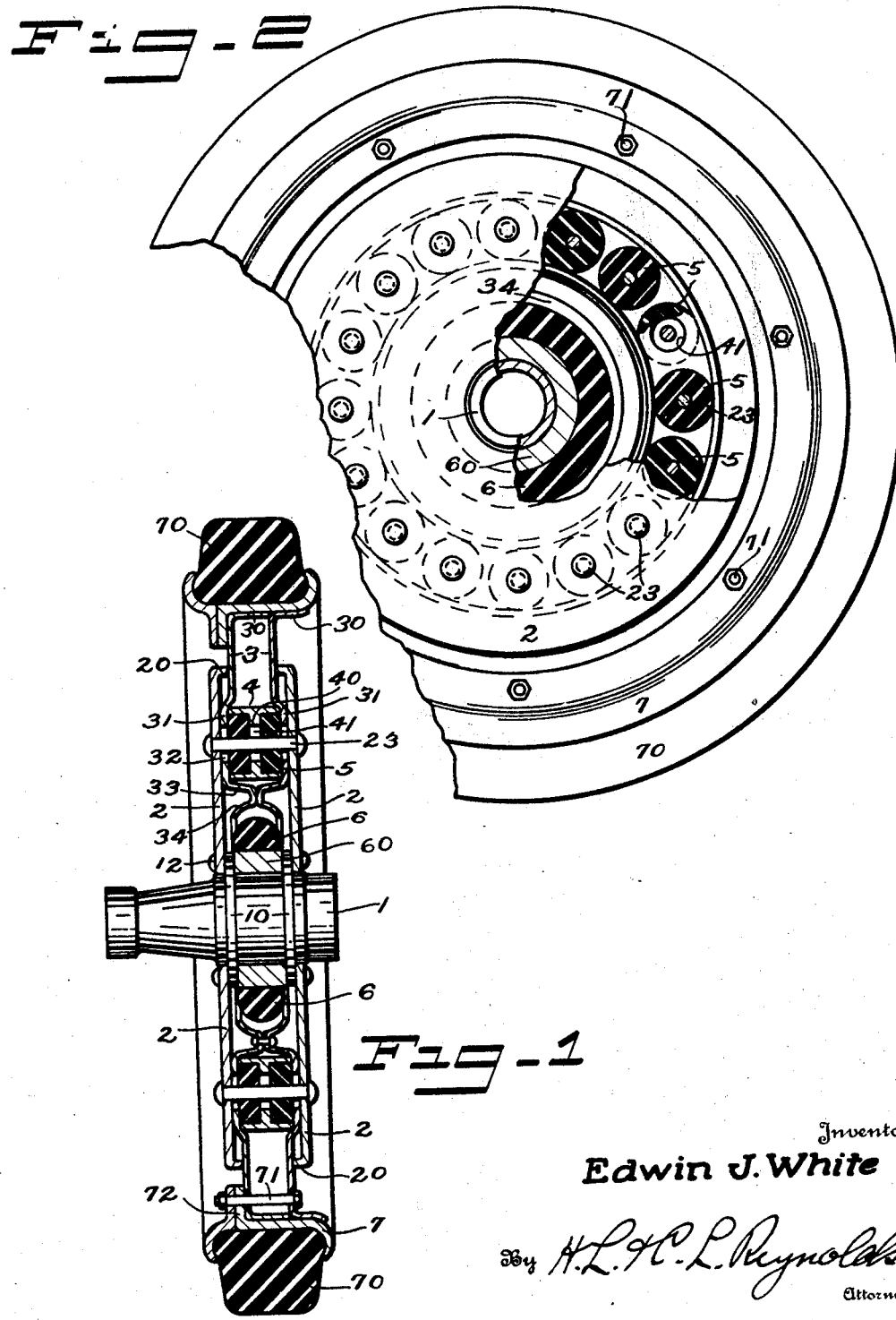

1,569,106

UNITED STATES PATENT OFFICE.

EDWIN J. WHITE, OF SEATTLE, WASHINGTON.

RESILIENT WHEEL.

Application filed July 14, 1925. Serial No. 43,460.

*To all whom it may concern:*

Be it known that I, EDWIN J. WHITE, a citizen of the United States of America, and resident of the city of Seattle, in the county of King and State of Washington, have invented certain new and useful Improvements in Resilient Wheels, of which the following is a specification.

My invention relates to resilient wheels and is of a type in which a hub section and a rim section are mounted so as to have a limited movement in the plane of the wheel along radial lines, and in which resilient members such as blocks of rubber are so interposed between the rim and hub sections as to give under the impact of blows and the effect of loads.

The object of my invention is to provide a construction by which the operation of the wheel is improved, and also to simplify the construction and to secure rigidness of the wheel against all relative movements of the parts, excepting those which are in the plane of the wheel.

The features of my invention which I believe to be new will be hereinafter described and the parts which I desire to cover by a patent will be specifically defined in the claims.

The accompanying drawings show my invention in the type of construction which I now most prefer.

Figure 1 is a section taken transversely of the wheel, on substantially a diameter thereof.

Figure 2 is a fragmentary side view of a wheel containing my construction, parts thereof being broken away to show the interior construction.

In the construction illustrated in the drawings, 1 represents a hub which is shown as having flanges as 10, which serve as means for securing thereto the two separated plates 2 which form the hub web section of the wheel. These plates 2 are secured to the flanges 10 of the hub as by the use of bolts or rivets 12. The two plates 2 are alike. At their outer edges or peripheries they have a slight flange as 20, and the plates are positioned in the wheel so that these flanges of the two plates project towards each other. These plates are also secured together in spaced relation by bolts or pins as 23, located towards the outer portion of the plates and functioning, in addition, as the supporting axes for the main resilient members.

The rim 7 upon which is placed the tire 70, may be of a considerable variety of construction. Its special construction forms no essential part of my present invention. As illustrated this rim is provided with flanges, as 72, and these flanges are secured to the plates 3 which form the web portion of the rim section, as by bolts or rivets 71.

The plates 3 which form the web section of the rim are alike in shape, excepting that as illustrated the flanges 30 which engage the rim 7 are shown as extending in opposite directions, as referred to the plate itself, but in the same direction as referred to their assembled position in the wheel. These flanges 30 bear against the inner face of the rim 7.

The plates 3, which are annular, having a considerable opening extending about their axis, are each provided with an outwardly pressed section 31, which form two shallow grooves or troughs, these opening towards the central plane of the wheel, that is, towards each other. The outer faces of the trough sections bear against the inner faces of the plates 2 to form sliding bearings. They are also provided with holes, as 32 surrounding the connecting pins 23, and sufficiently larger than the pins to provide for limited movement of the two web sections.

Inwardly of the troughs 31 the plates 3 are given flanges 33 which extend toward the center of the wheel, preferably until they come in contact, and are then bent outwardly to form flanges 34 which form a trough, concaved toward the hub of the wheel. This trough is designed to form a bearing surface, engaged by a resilient ring 6, which ring is carried upon and surrounds the hub, but which under light load conditions is not in contact with the flanges 34. Contact between these two members is supposed to occur only under heavy loading or shock conditions. Between the resilient ring 6 and the hub 1 I prefer to place a ring, as 60, which ring is preferably made of wood or material of an analogous character.

A ring 40 is seated in the annular troughs or depressions 31 of the plates 3 forming the web portion of the rim. This ring is provided with a series of pockets or recesses, in each of which is placed a resilient member, as a block 5 of rubber. These also have supporting engagement with the bolts or pins 23 which connect the two plates 2 of the hub. It is evident that a load placed upon the hub will have a tendency to compress the resilient blocks 5. These being carried upon the pins 23 and bearing against the walls of the recesses or pockets in which they are placed when compressed, permit limited movement between the web sections of the hub and rim in the direction of the plane of the wheel. These resilient members 5 are designed to provide the resiliency which is active under normal or moderate load and shock conditions. When, however, the load or the shock becomes too great to be accommodated by their resiliency, this is supplemented by contact of the flanges 34 with the resilient ring 6.

As the rim 7 is designed to be provided with a tire 70 of resilient character, the three separate types of resilient devices thus employed coact to give a wheel having a large degree of resiliency. The construction is such also that the wheel is rigid as against lateral distortions. The type of construction is such as to be cheaply made, and also such that depreciation is slight. A wheel of this sort approaches towards the resiliency displayed by a pneumatic tired wheel when the latter is heavily inflated as it must be to carry heavy loads. This wheel is also not subject to puncture such as are pneumatic tired wheels.

What I claim as my invention is:

1. In a resilient wheel, in combination, a hub section, a tread section, web sections carried respectively by the hub and the tread sections and having restrained relative sliding movement in the plane of the wheel, one of said web sections having a ring receiving annular recess, a ring seating in said recess and having disk-receiving pockets, resilient disks in said pockets, and disk supporting axles passing through said disks and supported in the other web section from that which carries the disks.

2. In a resilient wheel, in combination, a hub section, a rim section, webs carried by each of said sections and having restrained relative sliding movement in the plane of the wheel, resilient disks interposed between and supporting said webs against movement in said plane, and a resilient ring interposed between the hub and the webs of the rim section.

3. In a resilient wheel, in combination, a hub section, a tread section, web sections carried respectively by the hub and the tread sections and means for holding said web sections together to permit restrained relative sliding movement in the plane of the wheel, the web section carried by the rim being composed of two separated annular plates, provided upon their inner faces with like annular recesses and at their inner edges being turned outwardly to between them form a trough facing towards their axis, a resilient ring supported upon and surrounding the hub with its periphery positioned to be engaged by said trough only when a certain degree of loading is reached.

4. In a resilient wheel, in combination, a hub section and a rim section, each section having a web section composed of complementary annular plates spaced apart, said plates of the rim section fitting between the plates of the hub section and having a ring retaining annular recess upon the inner face of each, a ring fitting in and secured by said annular recesses, said ring having a series of pockets in its side faces, resilient blocks fitting in said pockets, pins connecting the plates of the hub web section and extending through said resilient blocks, the plates of the rim web section having holes for said pins of an excess size to permit a limited free movement of the pins therein.

5. In a resilient wheel, in combination, a hub section and a rim section, each having two separated annular plates, the said plates of the rim section having in each a like outwardly pressed annular groove, and inwardly of said grooves approaching to contact with each other and then flaring laterally to form an axially facing trough, a ring seated in the annular grooves of the plates of the rim section and having pockets therein, resilient blocks in said pockets, pins forming axles for said blocks and connecting the plates of the hub section, the plates of the rim section having holes accommodating said pins to permit a limited movement of the plates in the plane of the wheel, and a resilient ring seating upon the hub and with its periphery in unloaded condition of the wheel positioned slightly out of contact with the axially facing trough of the rim section.

Signed at Seattle, King County, Washington, this 9th day of July, 1925.

EDWIN J. WHITE.